(12) United States Patent
Wu et al.

(10) Patent No.: US 6,487,936 B1
(45) Date of Patent: Dec. 3, 2002

(54) AUXILIARY-BICYCLE TORSION SENSING AND LARGE GEAR PLATE MINIMIZATION APPARATUS

(75) Inventors: Ching-Huei Wu, Hsinchu (TW);
Ching-Wen Liu, ChangHua (TW);
Chung-Ping Chiang, Taipei (TW);
Cheng-Chung Yen, Hsinchu (TW);
Chih-Ming Liang, KaoShiung (TW)

(73) Assignee: Industrial Technology Research Institute (TW)

( * ) Notice: Subject to any disclaimer, the term of this patent is extended or adjusted under 35 U.S.C. 154(b) by 0 days.

(21) Appl. No.: 09/859,434

(22) Filed: May 18, 2001

(51) Int. Cl.$^7$ ............................................. F16H 37/06
(52) U.S. Cl. ..................................... 74/665 B; 180/206
(58) Field of Search ..................... 74/665 B; 180/205, 180/206, 207

(56) References Cited

U.S. PATENT DOCUMENTS

| | | | | |
|---|---|---|---|---|
| 5,370,200 A | * | 12/1994 | Takata | 180/206 |
| 5,915,493 A | * | 6/1999 | Nakayama | 180/206 |
| 5,941,333 A | * | 8/1999 | Sun et al. | 180/206 |
| 5,984,038 A | * | 11/1999 | Fujiwara et al. | 180/206 |
| 6,012,538 A | * | 1/2000 | Sonobe et al. | 180/220 |

* cited by examiner

Primary Examiner—Dirk Wright
(74) Attorney, Agent, or Firm—Troxell Law Office PLLC

(57) ABSTRACT

An auxiliary-bicycle torsion sensing and large gear plate minimization apparatus, arranged in transmission apparatus of an auxiliary-bicycle, includes a sun gear, a unidirectional device, a planet gear set and a sensing device. The sun gear of planet gear set is connected to the crank axle of auxiliary-bicycle and driven directly with it. The stepping power of crank axle is output to the large gear plate of auxiliary-bicycle through the transmission of sun gear, planet gear and unidirectional device. Also, one side of swing arm, used for pivotally arranging sun gear and planet gear, is arranged with the sensing device. When crank axle is rotated by the stepping force of rider, the swing arm will generate a rotation torsion, and sensing device senses the torsion value to control the power output of driving motor. The present invention has the characteristics of simple structure, low manufacture cost, more accurate sensitivity, and further instant changeable rotation ratio between crank axle and large gear plate to meet the object of broader application, such as the outlook beautification due to the minimization of large gear plate.

10 Claims, 3 Drawing Sheets

AUXILIARY-BICYCLE TORSION SENSING AND LARGE GEAR PLATE MINIMIZATION APPARATUS

FIELD OF THE INVENTION

The present invention is related to an auxiliary-bicycle torsion sensing and large gear plate minimization apparatus, especially to an apparatus arranged at the transmission apparatus of auto-auxiliary-bicycle for sensing the torsion and acceleration of stepping force as rider is riding the auto-auxiliary-bicycle. Hence the large gear is minimized and the variation of outlook beautification is met.

BACKGROUND OF THE INVENTION

In current market, the wheels of popular auto-bicycle (also called auto-auxiliary-bicycle) are driven to rotate mainly by arranging auxiliary devices at bicycle (auxiliary-bicycle), such as battery, driving motor, and transmission apparatus, etc. When rider steps on the treadles of bicycle, besides the stepping force drives the wheels, the driven motor also generates a power that is transmitted by transmission apparatus and drives bicycle's wheels to rotate. Hence the strength of the rider to drive the bicycle may be reduced and the object of auxiliary-bicycle is met.

Because the rider needs different powers output from driven motor to drive the wheels according to the uphill and downhill situations and to different driving speeds, each manufacturer also develops stepping force sensor for detecting the stepping strength of bicycle rider. And according to the stepping force detected by the sensor, the power transmitted by the driven motor is controlled. In general, the current prior stepping force sensing manners includes following three methods: transferring torsion value into axial displacement, absolute angular displacement and relative angular displacement. Wherein the method of relative angular displacement, during low driving speed, may not obtain a continuous signal and therefore is scarcely adapted. As for axial displacement and absolute angular displacement, their sensing methods possess no such problem.

Also the large gear plate of traditional bicycle is too large, during covering transmission chain, covering volume is too big and outlook is disgraceful. If the size of traditional large gear plate is reduced, it can meet the object of outlook beautification.

As shown in FIG. 1, wherein one example for the patent of U.S. Pat. No. 5,474,148 adapts the torsion sensing apparatus of absolute angular displacement. The major mechanisms of this torsion sensing apparatus are: stepping force directly drives the unidirectional device 42 by crank axle 28, the power is transmitted to the planet arm 44 of a planet gear set by unidirectional device 42, and finally power is output by the ring gear 46 connected with large gear plate of bicycle, wherein the sun gear is connected to sensor. For a planet gear system, at the situation of uniform speed, since larger the stepping force is, larger the torsion input to planet arm 44 is, so when sun gear 45 is connected to an elastic body, i.e. the torsion value of sun gear 45 may be transferred into the absolute angular displacement of elastic body. Since the absolute angular displacement is proportional to stepping force, so it may control the power output of driving motor. However, since this prior art needs use of many sets of complicated parts of planet gears and umbrella gears, etc, so not only the structure is complicated, but also the costs of parts manufacture and assembly are relatively higher. Additionally, since the driving motor of U.S. Pat. No. 5,474,148 outputs the power to large gear plate to drive wheels through ring gear 46, so driving motor also influences the torsion value of sun gear 45 as power is output. Namely, if the influence of stepping force of rider on torsion value of sun gear is firstly overcome over (or larger than) that of driving motor, then the driving motor will continue to output power. So the power output of prior art is slower, and can not respond instantly to the rider's power requirement. Additionally, in prior art, since the planet arm 44 is used to transmit power to wheels by rotating the ring gear 46, so the reducing speed of this device is larger, and U.S. Pat. No. 5,474,148 also applies such device to proceed the task of reducing speed of rotation speed of driving motor. However, when the rider does not use the driving motor to output power (i.e. battery is out of power), the rider will step more rounds to make the crank axle 28 drive the wheel to move and it causes lots of inconveniences.

There is another prior art example for applying absolute angular displacement method as torsion sensing apparatus. The power transmission of driving motor and stepping force sensing are proceeded mainly by the connection transmission of multi-sets of differential umbrella gear set. Besides its shortcoming is the cost increase caused by the application of multi-sets of differential umbrella gear set, its main shortcoming is focused on the crank axle that is directly connected and actuated with the large gear plate by the unidirectional umbrella gear ratchet. So, when the driving motor can not output power, the crank axle and the large gear plate rotate synchronously with one to one speed ratio. This sort of application lacks flexibility.

Another prior art example is to apply the axle direction displacement method as torsion sensing apparatus. Its torsion sensing method is mainly comprised by stepping force to drive a screw through crank axle. As the screw is rotating, it will cause a displacement along nut axle direction for the screw and also press down the spring located between screw and nut. Finally the nut outputs the power to gear plate through unidirectional device. Therefore by the magnitude of elastic coefficient of spring, the ratio between the value of stepping force and axle direction displacement of screw can be determined. So the stepping force value can be known just by sensor to measure the magnitude of axle direction displacement of screw. The shortcoming of this prior art is that the match between screw and nut is easily interfered by the external objects or fragment generated by the operation of parts of itself. They may further be jammed seriously between screw and nut to make the stepping force sensing become inaccurate. Furthermore, when there is no power output from the driving motor, the crank axle and gear plate of patent of U.S. Pat. No. 288,427 could only synchronously rotate with one to one speed ratio and that is of less flexibility in real application.

Another kind of prior art example is applying axle direction displacement method as torsion sensing apparatus. Its torsion sensing method is mainly by stepping force to drive a torsion rod through crank axle. Because the skew planes structure among the torsion rods, it causes an axle direction displacement for the torsion rod. This displacement is further magnified from rod to rod. Therefore, the value of stepping force is known by measuring the magnified axle direction displacement of lever. The shortcomings of this prior art are that besides the structure is more complicated and the cost is higher, also the sensing accuracy is easily interfered by the fragment generated by the above-mentioned parts of itself and crank axle and gear plate can only synchronously rotate with one to one speed ratio.

SUMMARY OF THE INVENTION

The main object of the present invention is to provide an auxiliary-bicycle torsion sensing and large gear plate minimization apparatus, which has the merits of simple structure, lower manufacture cost, accurate stepping force sensing for rider, less interference by parts fragment, and design flexibility enhanced by application of different rotation speed between the crank axle stepped by rider and the large gear plate. These merits will overcome the shortcomings of prior arts. And the minimization of large gear plate may promote the outlook beautification of auxiliary-bicycle.

Another object of the present invention is to provide an auxiliary-bicycle torsion sensing apparatus, wherein the torsion of stepping force of rider is transmitted by the swing arm of planet gear system and the absolute angular displacement of swing arm is measured by a sensing apparatus to further control the driving apparatus to output power to drive the wheels to rotate. This arrangement has the advantages of simple structure, low manufacture cost, accurate stepping force measurement, and instant accurate responding rider's stepping force magnitude from the power output of driving apparatus, etc. And the minimization of large gear plate for auxiliary-bicycle may meet the object of outlook beautification.

To achieve above-mentioned objects, an auxiliary-bicycle torsion sensing apparatus of the present invention at least includes a sun gear, a unidirectional device, a planet gear set, a second planet gear, and a sensing apparatus. The auxiliary-bicycle torsion sensing apparatus is provided for arranging at transmission apparatus of auxiliary-bicycle. The transmission apparatus at least includes a crank axle, a gear plate and speed-variation gear set. The power output of a driving apparatus may be controlled by the rotation of crank axle. The power output of driving apparatus can drive gear plate to rotate through the transmission of transmission apparatus.

The sun gear of the auxiliary-bicycle torsion sensing apparatus is fixed on the crank axle and driven to rotate with the crank axle. The planet gear set at least includes a swing arm and a first planet gear. The swing gear is pivotally arranged on the crank axle by pivotal rotation method. The first gear is pivotally arranged on the swing arm and driven to rotate together with the sun gear. The first planet gear may be driven to rotate by the rotation of crank gear. And the swing arm further generates a rotation torsion of upward rotation which is same as that of the sun gear. The sensing apparatus is connected to one side of the swing arm, which can measure the rotation torsion of the swing arm and generates a sensing signal to control the power output of the driving apparatus. The unidirectional device is connected to the gear plate and can proceed single direction transmission. The second planet gear is arranged on the planet gear set and driven together with the first planet gear. The second gear is driven together with the unidirectional device. And the single transmission direction of unidirectional device can make the second planet gear drive gear plate to rotate, but gear plate can not drive the second planet gear to rotate.

In a preferable embodiment, the auxiliary-bicycle torsion sensing apparatus further includes a medium gear and a ring gear. The medium gear matches with the second gear and the ring gear matches with both medium gear and unidirectional device. And the sensing apparatus includes a pushing pillar, a replacement element, a pushing block, and a stress sensor. One end of the pushing pillar pushes against the swing arm. Another end is connected with the stress sensor. The pushing pillar may transfer the rotation torsion of the swing arm to stress sensor. The pushing block is pushing against the swing arm. The replacement element is connected to the pushing pillar. An elastic force may be provided to make the pushing pillar maintain a predetermined position under the state of no external force.

Preferable, the speed-variation gear set is comprised of several matching multi-level gears.

Preferable, the driving apparatus is a electric driving motor.

For your esteem review committee member to further understand and recognize the present invention, in accordance with several drawings a detailed description is presented as following.

DETAILED DESCRIPTION OF THE PREFERRED EMBODIMENTS

One characteristic of the auxiliary-bicycle tension sensing and large gear plate minimization apparatus is a planed gear set that is arranged inside the transmission apparatus of an auxiliary-bicycle. Wherein the sun gear of the planet gear set is connected to the crank axle of the auxiliary-bicycle and directly driven together with it. And the stepping force of the crank axle is then output to the gear plate of the auxiliary-bicycle through the transmission of both sun gear and planet gear. Also, one side of the swing arm of the planet gear set (i.e. the connection arm used to pivotally arrange both sun gear and planet gear) arranges with a stress sensor. When the crank axle is rotated by the stepping force of rider, the swing arm would generate a rotation torsion, the power output of the driving motor is controlled by the torsion value sensed by the stress sensor. Because the present invention only adapts with single-level planet gear set to achieve the functions of power transmission and torsion detection, the structure of application parts is simple and manufacture cost is low. And the metal ashes or external objects further won't influence the sensing accuracy. Furthermore, the sensing method of the present invention applies the tangent force component of the rotation of the sun gear (i.e. crank axle) to make the swing arm generate rotation torsion, just only does the rider step on the crank axle, instantly may the output power of driving motor be obtained. Compared with the prior art, the present invention may more directly, more instantly and more accurately fulfill the requirement of motor power. Additionally, because the crank axle of the present invention is not directly connected and driven with the large gear plate of the auxiliary-bicycle, but the power of the crank axle is output to the large gear plate through the matching transmission of both sun gear and planet gear. So, when there is no power output from the driving motor, the rotation ratio between the crank axle and large gear plate is not absolutely the relationship of one to one but determined by gear tooth number ratio between the sun gear and planet gear. So, the auxiliary-bicycles with different rotation speed ratio may further be designed out to make the present invention may be applied to broader scopes.

A detailed description for an auxiliary-bicycle torsion sensing and large gear plate minimization apparatus of one preferable embodiment of the present invention, in accordance with detailed structure, motion manners, function and other characteristic, is presented as following.

Figure 1:
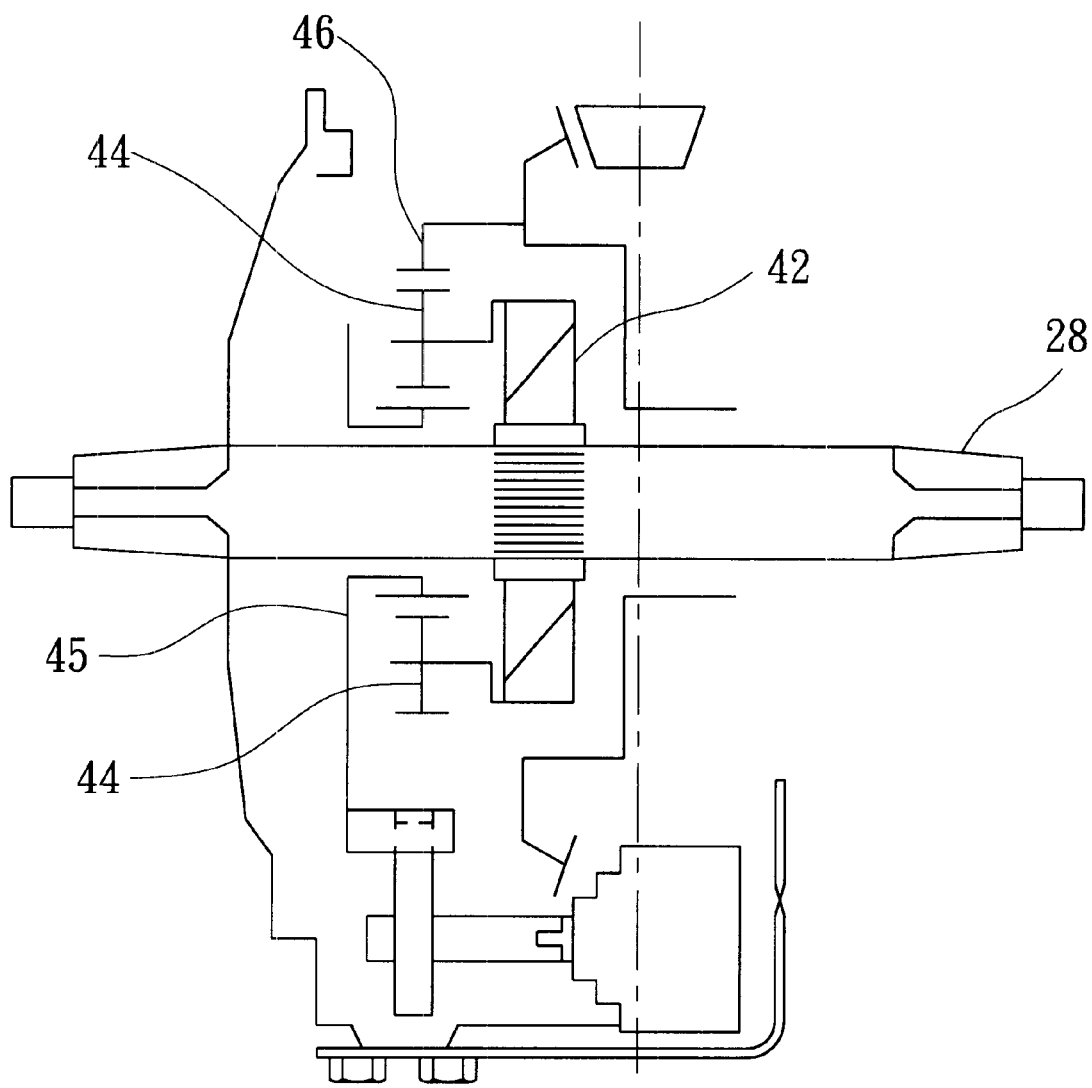
FIG. 1 is an illustration for the prior auxiliary-bicycle torsion sensing apparatus.
Figure 2:
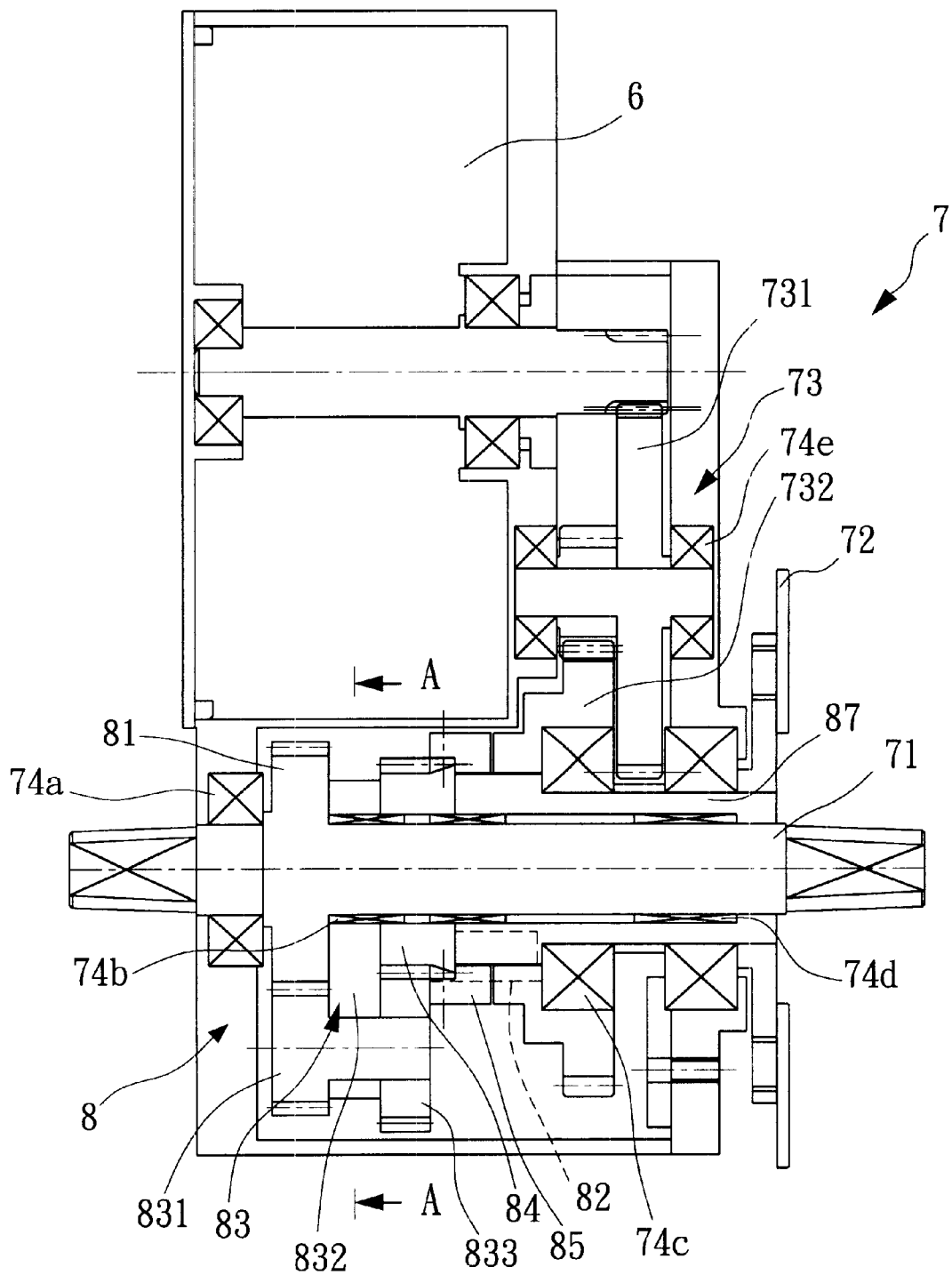
FIG. 2 is a preferable embodiment illustration for the auxiliary-bicycle torsion sensing apparatus of the present invention.
Figure 3:
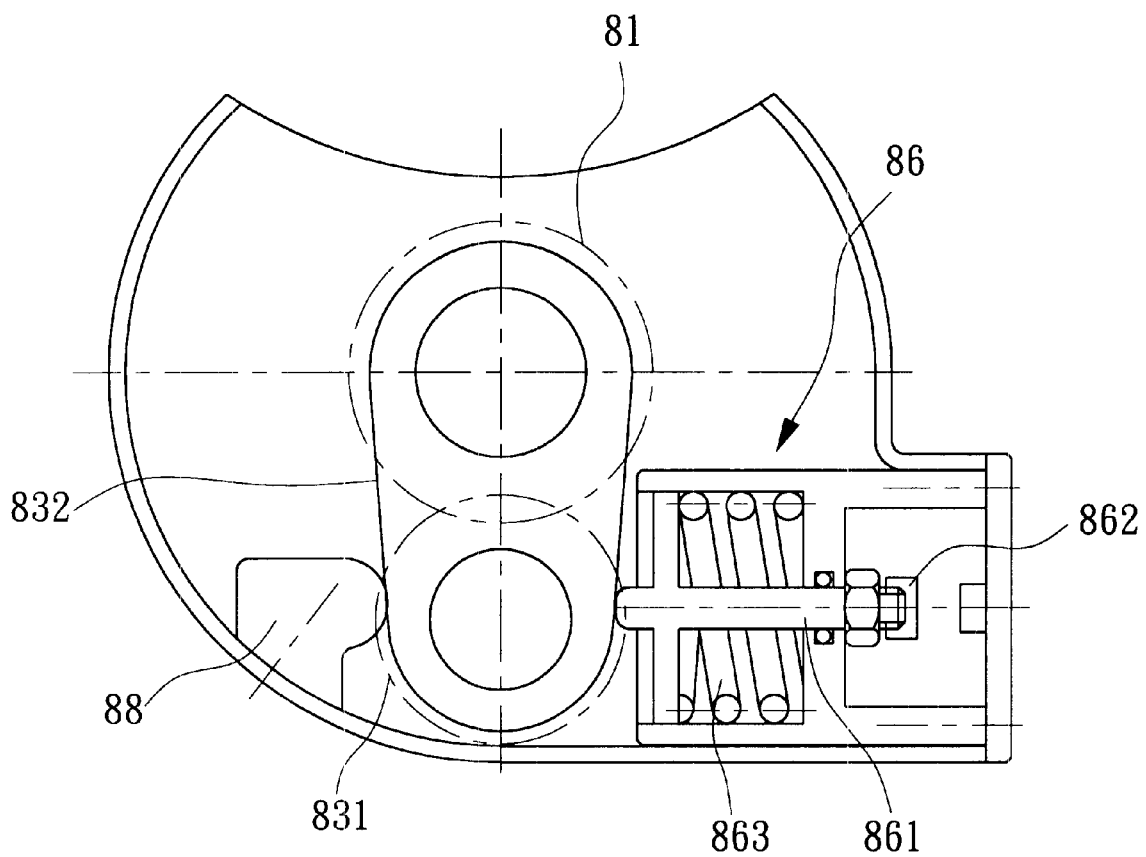
FIG. 3 is an A—A section view illustration for FIG. 2.

Please refer to FIG. 2 and FIG. 3, which show one preferable embodiment of auxiliary-bicycle torsion sensing apparatus of the present invention. Wherein, FIG. 2 is a preferable embodiment illustration for the auxiliary-bicycle torsion sensing apparatus of the present invention. FIG. 3 is an A—A section view illustration for FIG. 2.

An auxiliary-bicycle torsion sensing apparatus 8 of the present invention is provided and arranged at a transmission apparatus 7 of auxiliary-bicycle. The transmission apparatus 7 at least includes a crank axle 71, a gear plate 72 (large gear plate) and a speed-variation gear set 73. The power output of a driving apparatus 6 is controlled by the rotation of the crank axle 71. The power output of the driving apparatus 6 may drive the gear plate 72 to rotate through the transmission of the transmission apparatus 7. In the preferable embodiment of the present invention, the driving apparatus 6 is an electric driving motor. The speed-variation gear set 73 is a speed-reduction gear set that is comprised by several matching multi-level gears 731, 732. Its speed reduction is dependent on the power output rate and rotation speed of the driving apparatus 6 (driving motor) and multi-level gear 731, 732 with different level number and different matching gear number is designed out. So, the design of rotation speed and torsion of the gear plate 72 may fulfill the requirement of the rider as he really drives the auxiliary-bicycle.

Since the element mechanism or apparatus of the described auxiliary-bicycle of the present invention, such as: detailed structure, arrangement position of the transmission apparatus 7, driving apparatus 6 (electric driving motor) and its source and control circuit, gear plate 72 with transmission mechanism of chain or wheel, etc., and crank axle 71 with detailed structure of treadle, etc. are the all technique belonged to prior art and not technique characteristic requirement of the present invention. So the detailed structure and actuation methods are not described repetitiously in following. The relevant material may be referred from the content of prior art described in the background of invention of the present patent application.

The characteristics of the present invention are the auxiliary-bicycle torsion sensing apparatus 8 and its connection relationship and actuation methods with the crank axle 71 and multi-level gear 732. The auxiliary-bicycle torsion sensing apparatus 8 includes: a sun gear 81, a unidirectional device 82, a planet gear set 83, a medium gear 84, a gear 85, and a sensing apparatus 86.

The sun gear 81 of the auxiliary-bicycle sensing apparatus 8 is fixed at crank axle 71 and directly driven synchronously to rotate. The planet gear set 83 at least includes a swing arm 832, a first planet gear 831, and a second planet gear 833. The swing arm 832 is pivotally arranged at the crank axle 71 by pivotal rotation method. The first planet gear 831 is pivotally arranged at the swing arm 832 and matched with the sun gear 81. The first planet gear 831 is driven to rotate by the rotation of the crank axle 71. And, when the sun gear 81 rotates, its tangent force component may make the swing arm 832 generate a rotation torsion with upward rotation direction which is same as that of the sun gear 81. The sensing apparatus 86 is connected to one side of the swing arm 832 (preferably arranged at the side of rotation direction of the swing arm) to sense the rotation torsion of the swing arm 832 and generates a sensing signal to provide and control power output for the driving apparatus 6.

The second planet gear 833 is arranged at the planet gear set 82 and connected with the first planet gear 831 in same axle and rotated synchronously. The second planet gear 833 is matched to a medium gear 84, while ring gear 85 is matched with medium gear 84 and unidirectional device 82 to proceed transmission. So, the second planet gear 833 may connect and actuate with the unidirectional device 82. Wherein, the unidirectional device, preferably a unidirectional ratchet device, is connected with the gear plate 72 by an axle sleeve 87 and may rotate synchronously with the gear plate 72. Since the said unidirectional device 82 is a prior technique, so its detailed structure is not described here repetitiously. And, the single direction transmission of the unidirectional device 82 makes the second planet gear 833 may actuate the gear plate 72 to rotate, but the gear plate 72 can not actuate the second planet gear 833 to rotate (it will rotate idly). Also, since the crank axle 71 of the present invention is not directly actuated with the large gear 72 of the auxiliary-bicycle but the power of the crank axle 71 is output to the large gear plate 72 by the matching transmission between the sun gear 81 and the planet gears 831, 832, so when there is no power output from the driving motor 6 (e.g. when the rider intends to use the auxiliary-bicycle as ordinary bicycle, or when the battery lacks electricity to make the power output of the driving apparatus 6 be insufficient), the rotation speed ratio between the crank axle 71 and the large gear plate 72 is determined by the gear tooth number ratio between the sun gear 82 and the planet gear 831, 832, and medium gear 84. If the manufactures of auxiliary-bicycle intend to design out a faster auxiliary-bicycle appropriate for the ordinary plain riders (e.g. the metropolitan consumers), the manufactures only need to change the rotation ratio between the crank axle 71 and the large gear plate 72 to be smaller than the value of one, then when the rider steps one round of the crank axle, the driving effect of several round of rotation for the gear plate 72 will be generated, so the auxiliary-bicycle can be ridden very faster even when there is no motor power output, and there is completely no need to change the speed reduction ratio of other transmission apparatus 7 or output rate of the driving motor. While the manufactures intends to design out an auxiliary-bicycle for leisurely riding appropriately for the rider in ordinary uphill and downhill road (e.g. the consumers living in country or mounds), the rotation ratio between the crank axle 71 and the large gear plate 72 can be made to be larger than one. Now, the rider needs to step several rounds to drive the gear plate 72 to rotate one round, and the riding is more energy-saving and appropriate for uphill road, however the design is complete no need to change the mechanism or speed reduction ratio of other transmission apparatus.

Wherein, among the speed-variation gear set 73 one multi-level gear 732 is matched and actuated with the unidirectional device 82 to make the speed-variation gear set 70 connected and actuated to the gear plate 72 also through the transmission of the unidirectional device 82. And the speed-variation gear set 73 may actuate the gear plate 72 to rotate through the transmission of the unidirectional device 82, but the gear plate can not actuate the speed-variation gear set 82 and also the crank axle 72 to rotate (they will rotate idly). Therefore, when the output power of the driving apparatus 6 drives the gear plate 72 to rotate, it also completely won't influence the torsion value of the swing arm 832. So, when the rider needs larger power, he just greatly steps down the crank axle 71 to rotate, the torsion sensing apparatus 86 instantly senses the variation of this torsion value and simultaneously controls the driving apparatus to output larger power. This sense of torsion is direct, instant and accurate to overcome the prior art's shortcoming that is caused by the torsion sense must first overcome the output power of the driving apparatus.

In the present preferable embodiment, the sensing apparatus 86 includes a pushing pillar 861, a stress-sensing device 862, a replacement element 863, and a pushing block 88. One end of the pushing pillar 861 pushes against the side of the rotation direction of swing arm 832. Another end of the pushing pillar is then connected with a stress-sensing device 862. The pushing pillar 861 may convert the rotation absolute angular displacement of the swing arm into a linear displacement and transmits the rotation torsion of the swing arm to the stress-sensing device 862. According to the sensed torsion value (or the electric potential difference caused by the corresponding variation), the stress-sensing device 862 generates a sensing signal to control the power output of the driving apparatus 6. The pushing block 88 pushes against the side opposite to the rotation direction of the swing arm 832 and positions it. The replacement element 863 (a compressed spring is preferable) connects to the pushing pillar 861 and under the state of no external force (when the rider does not step down the treadle) may provide a elastic force to make the pushing pillar 861 push the swing arm 832 back to original position. (13)

Of course, at appropriate positions of the torsion sensing apparatus 8 and the transmission apparatus 7 of the auxiliary-bicycle of the present invention, several bearings 74a, 74b, 74c, 74d, and 74e, etc are arranged, so several adjacent elements may proceed relatively sliding and rotating. Since the structure and arrangement positions of bearings 74a, 74b, 74c, 74d, and 74e are not the technique characteristics of the present invention and are well-known designs to those who skill such transmission mechanism, so they are not repetitious here.

Because the present invention only adapts with single-level planet gear set 83 to achieve the functions of power transmission and torsion sensing, the number of parts is less and the structure of application parts is simple and manufacture cost is low. And relative to the prior art using screws and nuts, the metal ashes or external objects further won't influence the sensing accuracy. Furthermore, the sensing method of the present invention applies the tangent force component of the rotation of the sun gear 81 (i.e. crank axle 71) to make the swing arm 832 generate rotation torsion, just only does the rider step on the crank axle 71, instantly may the output power of driving motor be obtained. Compared with the prior art, the present invention may more directly, more instantly and more accurately fulfill the requirement of motor power. Additionally, because the crank axle 71 of the present invention is not directly connected and driven with the large gear plate 72 of the auxiliary-bicycle, but the power of the crank axle 71 is output to the large gear plate 72 through the matching transmission of both sun gear 81, planet gear 831, 832 and medium gear 84. So, when there is no power output from the driving motor, the rotation ratio between the crank axle 71 and large gear plate 72 is not absolutely the relationship of one to one but determined by gear tooth number ratio between the sun gear and planet gear. So, the auxiliary-bicycles with different rotation speed ratio may further be designed out to make the present invention may be applied to broader scopes. Also the present invention first makes the stepping speed increase through design, then reduces the size of traditional large gear plate to further achieve the object of outlook beautification and overcome the shortcomings: the large gear plate of traditional bicycle is too large, during covering transmission chain, covering volume is too big and outlook is disgraceful.

While the invention has been described in terms of a preferred embodiment, various alternatives and modifications can be devised by those skilled in the art without departing from the invention. Accordingly, the present invention is intended to embrace all such alternatives that fall within the scope of the claims.

What is claimed is:

1. An auxiliary-bicycle torsion sensing and large gear plate minimization apparatus, said apparatus being engaged with a transmission apparatus of auxiliary-bicycle, said transmission apparatus comprising at least a crank axle, a gear plate and a speed-variation gear set; by rotating the crank axle, power output of a driving apparatus of said auxiliary-bicycle can be controlled; the power output driving the gear plate to rotate through the transmission of transmission apparatus; said auxiliary-bicycle torsion sensing and large gear plate minimization apparatus comprising:

a sun gear, which is fixed to the crank axle and driven together with it to rotate;

a planet gear set, which at least includes a swing arm and a first planet gear; the swing arm pivotally engaged with the crank axle and is capable of rotating about the crank axle in a limited degree; the first planet gear is pivotally engaged with the swing arm and driven together with the sun gear to rotate; the first planet gear is driven to rotate by the rotation of crank axle and further make the swing arm generating a rotation torsion in the same rotation direction which is same as that of sun gear; and a sensing apparatus, which contacts with one side of the swing arm and may sense the rotation torsion of the swing arm, and generates a sensing signal to control the power output of driving apparatus.

2. The auxiliary-bicycle torsion sensing and large gear plate minimization apparatus according to the claim 1, further comprising:

a unidirectional device, which is connected to the gear plate and may proceed a single direction transmission; and a second planet gear, which is arranged at the planet gear set and driven to rotate together with the second planet gear; the second planet gear is driven together with the unidirectional device; the direction of unidirectional transmission makes the second planet gear may drive the gear plate to rotate; however the gear plate can not drive the second planet to rotate.

3. The auxiliary-bicycle torsion sensing and large gear plate minimization apparatus according to the claim 2, wherein the speed-variation gear set connects and drives the gear plate through the transmission of the unidirectional device; the speed-variation gear set may drive the gear plate to rotate through the transmission of unidirectional device; however the gear plate can not drive the speed-variation gear set to rotate.

4. The auxiliary-bicycle torsion sensing and large gear plate minimization apparatus according to the claim 2, wherein the unidirectional device is a unidirectional ratchet device.

5. The auxiliary-bicycle torsion sensing and large gear plate minimization apparatus according to the claim 2, wherein the speed-variation gear set is a speed-reduction gear set.

6. The auxiliary-bicycle torsion sensing and large gear plate minimization apparatus according to the claim 2, wherein the speed-variation gear set is comprised of several matching together multi-level gears.

7. The auxiliary-bicycle torsion sensing and large gear plate minimization apparatus according to the claim 2, wherein it further includes a medium gear and a ring gear; the medium gear is matched with the second planet gear; the ring gear is then also matched with the medium gear and the unidirectional device.

8. The auxiliary-bicycle torsion sensing and large gear plate minimization apparatus according to the claim 1, wherein the driving apparatus is an electric driving motor.

9. The auxiliary-bicycle torsion sensing and large gear plate minimization apparatus according to the claim 1, wherein the sensing apparatus includes a pushing pillar and a stress sensor; one end of the pushing pillar pushes against the swing arm; another end is then connected with the stress sensor; the pushing pillar may transfer the rotation torsion of swing arm to the stress sensor.

10. The auxiliary-bicycle torsion sensing and large gear plate minimization apparatus according to the claim 9, wherein the sensing apparatus further includes a replacement element and a pushing block; the pushing block pushes against the swing arm; the replacement element connects to the pushing pillar and provides an elastic force to make the pushing pillar maintain a predetermined position under the state of no external force.

* * * * *